United States Patent
Sato et al.

(10) Patent No.: US 11,806,820 B2
(45) Date of Patent: Nov. 7, 2023

(54) LAMINATED MOLDING AND METHOD OF MANUFACTURING LAMINATED MOLDING

(71) Applicant: KOBE STEEL, LTD., Hyogo (JP)

(72) Inventors: Shinji Sato, Hyogo (JP); Takeshi Yamada, Hyogo (JP); Takemasa Yamasaki, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 26 days.

(21) Appl. No.: 17/646,943

(22) Filed: Jan. 4, 2022

(65) Prior Publication Data

US 2022/0126388 A1    Apr. 28, 2022

Related U.S. Application Data

(62) Division of application No. 16/646,870, filed as application No. PCT/JP2018/033895 on Sep. 12, 2018, now Pat. No. 11,524,352.

(30) Foreign Application Priority Data

Sep. 15, 2017  (JP) .................................. 2017-177691
Mar. 6, 2018   (JP) .................................. 2018-039447

(51) Int. Cl.
*B23K 9/04*     (2006.01)
*B22F 10/38*    (2021.01)
(Continued)

(52) U.S. Cl.
CPC .............. *B23K 9/042* (2013.01); *B22F 10/38* (2021.01); *B23K 35/0255* (2013.01);
(Continued)

(58) Field of Classification Search
CPC .. B22F 10/00; B23K 5/18; B23K 9/04; B23K 9/042; B23K 9/044; B23K 10/027;
(Continued)

(56) References Cited

U.S. PATENT DOCUMENTS

2013/0171472 A1*  7/2013  Takeda ..................... C22C 38/02
                                                            428/683
2013/0292362 A1   11/2013  Fairchild et al.
(Continued)

FOREIGN PATENT DOCUMENTS

CN       106180986 A      12/2016
CN       106466766 A      3/2017
(Continued)

OTHER PUBLICATIONS

X. Lu, Y. F. Zhou, X. L. Xing, L. Y. Shao, Q. X. Yang, S. Y. Gao, "Open-source wire and arc additive manufacturing system: formability, microstructures, and mechanical properties," The International Journal of Advanced Manufacturing Technology, 93, 2017, pp. 2145-2154, published Jun. 27, 2017. (Year: 2017).*

(Continued)

*Primary Examiner* — Vanessa T. Luk
(74) *Attorney, Agent, or Firm* — Studebaker & Brackett PC

(57) ABSTRACT

An additively manufactured object formed by depositing weld bead layers, each of the weld bead layers being obtained by melting and solidifying a filler metal made of a mild steel, the additively manufactured object includes a plurality of the weld bead layers having a ferrite phase with an average grain diameter of 11 μm or less in a part except for a surface oxide film.

5 Claims, 12 Drawing Sheets

(51) Int. Cl.
*C22C 38/00* (2006.01)
*B33Y 10/00* (2015.01)
*B23K 35/02* (2006.01)
*B23K 35/30* (2006.01)
*B33Y 80/00* (2015.01)
*B23K 103/04* (2006.01)

(52) U.S. Cl.
CPC ......... *B23K 35/3053* (2013.01); *C22C 38/00* (2013.01); *B23K 2103/04* (2018.08); *B33Y 10/00* (2014.12); *B33Y 80/00* (2014.12); *C21D 2211/005* (2013.01)

(58) Field of Classification Search
CPC ............ B23K 11/0013; B23K 15/0086; B23K 20/1215; B23K 25/005; B23K 26/34; B23K 26/342
See application file for complete search history.

(56) References Cited

U.S. PATENT DOCUMENTS

| 2016/0297024 | A1 | 10/2016 | Tan et al. | |
|---|---|---|---|---|
| 2017/0320162 | A1* | 11/2017 | Wang | ..................... B22F 10/25 |
| 2017/0320277 | A1* | 11/2017 | Wang | ..................... B22F 12/37 |
| 2018/0272600 | A1 | 9/2018 | Shaarawi et al. | |

FOREIGN PATENT DOCUMENTS

| JP | 2011083778 A * | 4/2011 | ............ B22F 3/1055 |
|---|---|---|---|
| JP | 2012-117132 A | 6/2012 | |
| JP | 2014-208876 A | 11/2014 | |
| JP | 2015-160217 A | 9/2015 | |
| JP | 2016-504194 T | 2/2016 | |
| WO | WO-2016070776 A1 * | 5/2016 | ............ B22F 3/1055 |
| WO | WO-2016070778 A1 * | 5/2016 | ............ B05C 19/04 |
| WO | 2017/131757 A1 | 8/2017 | |

OTHER PUBLICATIONS

Xiong Jun et al., "Influences of process parameters on surface roughness of multi-layer single-pass thin-walled parts in GMAW-based additive manufacturing", Journal of Materials Processing Technology, vol. 252, Sep. 11, 2017, pp. 128-136, XP085260230, ISSN: 0924-0136.

The extended European search report issued by the European Patent Office dated May 14, 2021, which corresponds to European Patent Application No. 18856349.8-1103 and is related to U.S. Appl. No. 16/646,870.

* cited by examiner

US 11,806,820 B2

LAMINATED MOLDING AND METHOD OF MANUFACTURING LAMINATED MOLDING

CROSS-REFERENCE TO RELATED APPLICATIONS

This application is a Divisional of U.S. patent application Ser. No. 16/646,870 filed Mar. 12, 2020, which is the U.S. National Stage of International Application No. PCT/JP2018/033895 filed Sep. 12, 2018, which claims benefit of priority to Japanese Patent Application No. 2018-039447 filed Mar. 6, 2018 and Japanese Patent Application No. 2017-177691 filed Sep. 15, 2017, the entire contents of which are incorporated herein by reference.

TECHNICAL FIELD

The present invention relates to an additively manufactured object and a production method of an additively manufactured object. More specifically, the present invention relates to an additively manufactured object formed by melting and solidifying a mild steel by use of an arc, and a production method of an additively manufactured object.

BACKGROUND ART

In recent years, there is a growing need for a 3D printer as production means and among others, for applications to a metal material, researches and developments toward practical use are being made in aircraft industry, etc. A 3D printer using a metal material is configured to shape a built-up object by melting a metal powder or metal wire by use of a heat source such as laser or arc, and depositing the molten metal.

Conventionally, as a technique for shaping a built-up object by depositing a molten metal, a production method of depositing layer by layer a filler metal on a welding path of a rotary substrate while rotating the rotary substrate to form a rotary article by use of a cold metal transfer welding apparatus including a welding torch is known (see, for example, Patent Literature 1).

In addition, there have been disclosed a shaping apparatus and a production method, in which the shaping apparatus includes a welding torch configured to melt a metal wire by arc discharge, a moving mechanism configured to move the welding torch, and a control unit configured to control the welding torch and the moving mechanism, and the production method includes controlling the amount of droplets formed by the melting of a metal wire, the draw-in speed of a metal wire that the weld torch draws in, and the travel speed of the weld torch, so as to deposit a bead of an upper layer in an oblique direction relative to a bead of a lower layer and shape an additively manufactured object (see, for example, Patent Literature 2).

Furthermore, as a hot-rolled steel sheet having improved strength and punchability, a steel sheet having a structure in which the area ratio of a ferrite phase is 80% or more, the average grain diameter of the ferrite phase is 6 μm or less, the precipitation amount of Ti-containing carbide is 0.22 mass % or more, and the average particle diameter of the carbide is 10 nm or less, has been proposed (see, for example, Patent Literature 3). Moreover, as a low-yield-ratio steel material for construction, a steel material having an Sn-containing chemical composition and having a microstructure in which the ratio of a ferrite phase is 40% or more and the average grain diameter of the ferrite phase is more than 3 μm and 20 μm or less, has been disclosed (see, for example, Patent Literature 4).

CITATION LIST

Patent Literature

Patent Literature 1: JP-T-2016-504194 (the term "JP-T" as used herein means a published Japanese translation of a PCT patent application)
Patent Literature 2: JP-A-2015-160217
Patent Literature 3: JP-A-2014-208876
Patent Literature 4: JP-A-2012-117132

SUMMARY OF INVENTION

Technical Problem

A built-up object shaped by an additive manufacturing method using arc welding is a built-up object having a plurality of structures (for example, in the case of a mild steel, including ferrite, perlite and bainite) due to a difference in the cooling rate of weld bead layers in solidification of a molten metal. In this case, the structural difference causes a variation in the mechanical strength (tensile strength, fatigue strength, toughness) and makes it difficult to obtain substantially uniform strength.

In the production methods of Patent Literatures 1 and 2, specific welding conditions are described, but the structure of a built-up object is not taken into account, and the structure of a built-up object is not referred to.

Patent Literatures 3 and 4 both are techniques relating to a rolled steel sheet, which differs from an additively manufactured object formed by melting and solidifying a filler metal by use of an arc.

The present invention has been made in consideration of those problems, and an object of the present invention is to provide an additively manufactured object configured to have substantially uniform strength by uniforming the structure of an additively manufactured object obtained by an additive manufacturing method using arc welding, and a production method of an additively manufactured object.

Solution to Problem

The object of the present invention can be achieved by the following configurations.

(1) An additively manufactured object formed by depositing a weld bead layer, each of the weld bead layers being obtained by melting and solidifying a filler metal made of a mild steel, the additively manufactured object including a plurality of the weld bead layers having a ferrite phase with an average grain diameter of 11 μm or less in a part except for a surface oxide film.

(2) The additively manufactured object according to (1), in which the plurality of weld bead layers having a ferrite phase with an average grain diameter of 11 μm or less have a Vickers hardness of 130 Hv or more and 178 Hv or less.

(3) The additively manufactured object according to (1) or (2), including, on at least one of a lower layer and an upper layer of the plurality of weld bead layers having a ferrite phase with an average grain diameter of 11 μm or less, another weld bead layer which is different in a crystal structure from the weld bead layers.

(4) The additively manufactured object according to (3), in which the another weld bead layer located on the lower layer of the plurality of weld bead layers has a mixed structure including bainite as a main component.

(5) The additively manufactured object according to any one of (1) to (4), in which each of the weld bead layers has a same shape in top view.

(6) A method for producing an additively manufactured object, including subjecting a weld bead layer formed of a weld bead obtained by melting and solidifying a filler metal made of a mild steel by use of an arc to repeated deposition of the weld bead layer of a next layer, in which an interlayer time and a heat input amount are controlled such that when the surface layer temperature of the weld bead layer is within a range of 200° C. to 550° C., the weld bead layer of a next layer is deposited.

(7) The method for producing an additively manufactured object according to (6), in which each of the weld bead layers is deposited while the interlayer time and the heat input amount are constant.

(8) The method for producing an additively manufactured object according to (6) or (7), in which each of the weld bead layers is deposited to have a same shape in top view.

(9) The method for producing an additively manufactured object according to (6), in which after a predetermined number of the weld bead layers are deposited, the interlayer time and heat input amount are controlled such that when the surface layer temperature of the weld bead layer is within a range of 200° C. to 550° C., the weld bead layer of a next layer is deposited.

Advantageous Effects of Invention

In the additively manufactured object of the present invention, the additively manufactured object includes a plurality of weld bead layers having a ferrite phase with an average grain diameter of 11 µm or less in a part except for a surface oxide film, and the plurality of weld bead layers provide for a uniformed structure, such that an additively manufactured object having substantially uniform strength can be obtained.

In the method for producing an additively manufactured object of the present invention, by controlling the interlayer time and heat input amount, when the surface layer temperature of the weld bead layer is within a range of 200° C. to 550° C., the weld bead layer of a next layer is deposited, and the weld bead layer provides for a uniformed structure having a ferrite phase with an average grain diameter of 11 µm or less in a part except for a surface oxide film, such that substantially uniform strength can be obtained.

DESCRIPTION OF EMBODIMENTS

The additively manufactured object and the production method for an additively manufactured object according to the present invention are described in detail below based on drawings. Each of the following embodiments is an example embodying the present invention and is not intended to limit the technical scope of the present invention.

First Embodiment

Figure 1:
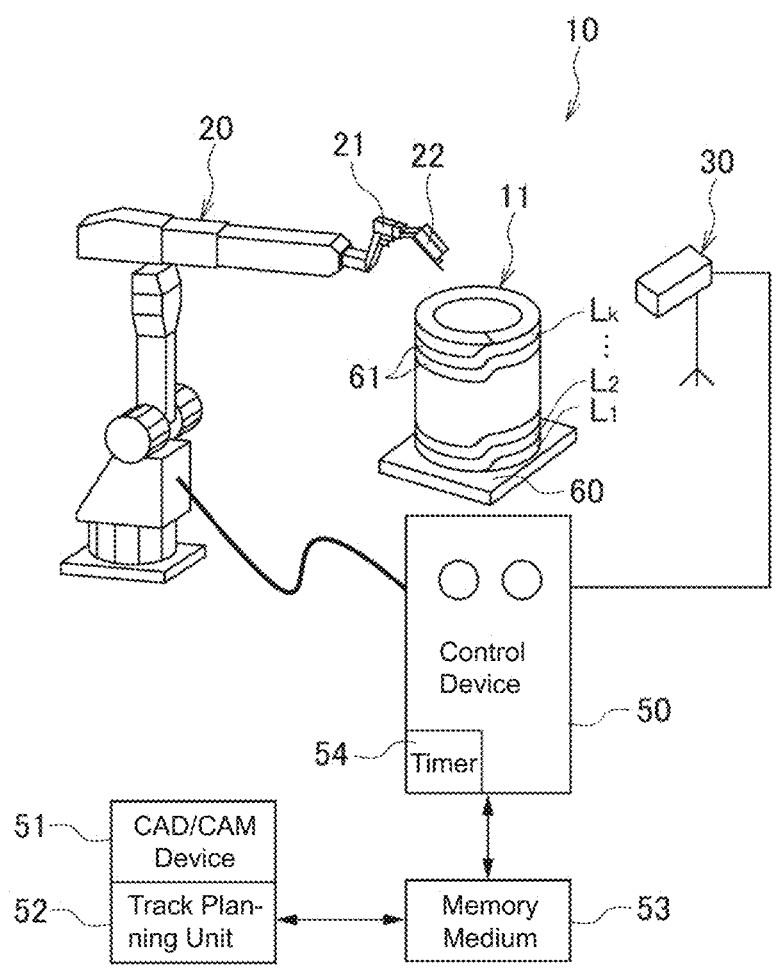
FIG. 1 is a schematic view of a configuration of the production system for an additively manufactured object in a first embodiment of the present invention.

First of all, a production system suitable for implementation of the additively manufactured object of this embodiment and the production method thereof is described by referring to FIG. 1. As illustrated in FIG. 1, the production system 10 for an additively manufactured object of this embodiment includes a welding robot 20, a temperature sensor 30, a control device 50, a CAD/CAM device 51, a track planning unit 52, and a memory 53. That is, in this embodiment, an existing welding robot 20 is used as the deposition device.

Figure 2:
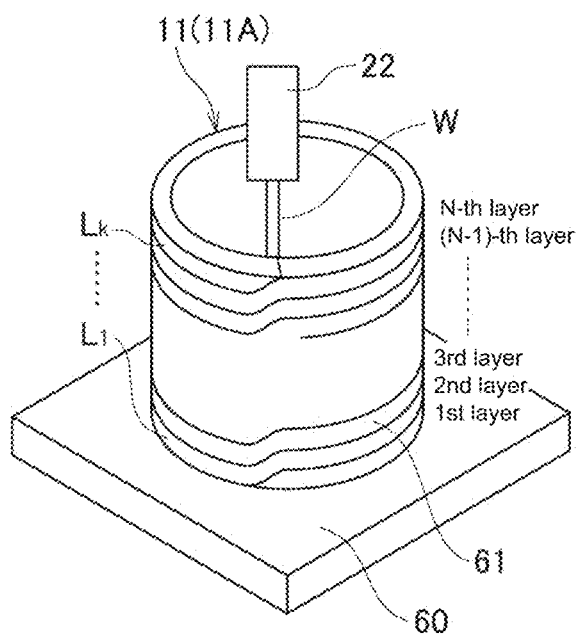
FIG. 2 is a perspective view of a cylindrical additively-manufactured object produced by the production system for an additively manufactured object illustrated in FIG. 1.

Referring also to FIG. 2, in the production system 10 for an additively manufactured object, a welding torch 22 is moved based on the layer profile data representing the profile of each of layers L1 . . . Lk of an additively manufactured object 11 or 11A while a filler metal (wire) W made of a mild steel is melted by the welding robot 20, and a weld bead layer 61 is deposited over a plurality of layers L1 . . . Lk to shape the additively manufactured object 11 or 11A. The filler metal made of a mild steel is specified to be a carbon steel having a carbon content of 0.3 mass % or less, and the solid wire includes JIS Z3312 YGW12, Z3312 YGW15, Z3312 YGW18, Z3312 YGW19, etc.

The additively manufactured object 11 illustrated in FIG. 1 and FIG. 2 is an example in which the weld bead layer 61 is continuously and spirally deposited (that is, the end of the weld bead layer 61 of a previous layer is continuous to the start of the weld bead layer 61 of a next layer) and is thereby formed into a substantially cylindrical shape, but the additively manufactured object 11 can be set to any shape.

The welding robot 20 is an articulated robot and includes the welding torch 22 at the tip of a leading arm 21. The leading arm 21 is three-dimensionally movable, and the welding torch 22 can move to any position in any posture by controlling the posture and position of the leading arm 21 by the control device 50.

The welding torch 22 includes a substantially tubular shield nozzle (not shown) to which a shielding gas is supplied, a contact tip disposed inside the shield nozzle, and a filler metal W held in the contact tip and supplied with a melting current. The welding torch 22 generates an arc with a shielding gas flowing while feeding the filler metal W to melt and solidify the filler metal W made of a mild steel and the weld bead layer 61 is thus deposited on a substrate 60 to form the additively manufactured object 11. The welding torch 22 may employ a non-consumable electrode with which a filter metal is supplied from the outside.

The temperature sensor 30 measures the surface layer temperature of the weld bead layer 61 deposited just before, and a contact measurement sensor may be used, but since the deposited weld bead layer 61 is at a high temperature, a non-contact measurement sensor such as thermoviewer or infrared temperature sensor is preferred.

In this embodiment, the temperature sensor 30 measures the temperature at the deposition start position of each layer.

The control device 50 controls the welding robot 20 and temperature sensor 30 to deposit a plurality of weld bead layers 61, thereby shaping the additively manufactured object 11.

The CAD/CAM device 51 creates profile data of the additively manufactured object 11 to be formed and then produces layer profile data representing the profile of each of the layers L1 . . . Lk by dividing the object into a plurality of layers (see FIG. 2). In the case of shaping a substantially cylindrical additively-manufactured object 11 illustrated in FIG. 2, the object is divided into profiles of respective layers L1 . . . Lk in the horizontal direction, and the layers are deposited in the perpendicular direction. The track planning unit 52 creates a specific deposition plan for the molten bead 61, such as movement track for the welding torch 22 in each of the layers L1 . . . Lk and planned height of the molten bead 61 when the molten bead 61 of each of the layers L1 . . . Lk is deposited. The memory 53 stores the produced layer profile data, movement track for the welding torch 22, interpass temperature Tp, etc.

The control device 50 controls the movement of the welding robot 20 including the welding current, arc voltage and welding speed based on, for example, the layer profile data, movement track for the welding torch 22 and interpass temperature Tp, which are stored in the memory 53, as well as the surface layer temperature of the weld bead layer 61 deposited just before, which is measured by the temperature sensor 30. In addition, the control device 50 has a built-in timer 54 for measuring the cooling time until the temperature of each weld bead layer 61 is cooled down to the allowable interpass temperature Tp from the temperature at the start of deposition.

By using such a production system 10 for an additively manufactured object, as illustrated in FIG. 2, the welding robot 20 moves the welding torch 22 along the planned movement track to deposit the weld bead layer 61 on the substrate 60 or on the weld bead layer 61 of a previous layer and at the same time, the temperature sensor 30 measures the surface layer temperature of the weld bead layer 61 deposited.

Here, the deposition of the weld bead layer 61 of a next layer is started when the surface layer temperature of the weld bead layer 61 of a previous layer is within the previously set allowable range of the interpass temperature Tp. Specifically, the weld bead layer 61 of a next layer is formed while the interlayer time and heat input amount (welding current, arc voltage, welding speed) are controlled to be constant such that the interpass temperature Tp is within the allowable range of 200° C. to 550° C.

However, in several weld bead layers 61 at an initial stage of depositing of the additively manufactured object 11, the weld bead layer 61 is cooled due to heat removal from the substrate 60 and therefore, the interpass temperature Tp cannot be within the allowable range by the control of interlayer time and heat input amount and consequently, becomes less than the lower limit temperature of the allowable range. As for such several weld bead layers 61 at an initial stage of depositing, the weld bead layer 61 of a next layer is formed just with the above-described constant interlayer time and heat input amount.

After that, monitoring the surface layer temperature of the weld bead layer 61 of a previous layer and depositing the weld bead layer 61 of a next layer when the interpass temperature Tp is in the allowable temperature range are repeated in the same manner as above for all layers up to the layer Lk to shape the additively manufactured object 11.

Here, in depositing the weld bead layer 61, in a case where the molten filler metal W made of a mild steel is rapidly cooled, a mixed structure including bainite as a main component is formed. In addition, in a case where the molten filler metal W made of a mild steel is naturally solidified, a structure containing coarse ferrite, perlite and bainite is formed.

On the other hand, in this embodiment, these structures are heated to exceed the transformation point of ferrite due to deposition of the weld bead layer 61 of next and subsequent layers and therefore, perlite and bainite are transformed into ferrite, and as a result, a structure in which the coarse ferrite is micronized is formed.

More specifically, in the additively manufactured object 11, the weld bead layer 61 of a next layer is deposited while the interlayer time and heat input amount are controlled such that the interpass temperature Tp is within the range of 200 to 550° C., and the weld bead layer 61 of next and subsequent layers is deposited in the same manner. Consequently, the weld bead layer 61 is heated to exceed the transformation point of ferrite, and a uniformed structure including a fine ferrite phase having an average grain diameter of 11 μm or less is obtained.

At the time of deposition of the weld bead layer 61 of a next layer, if the interpass temperature Tp is less than 200° C., even when the weld bead layer 61 is heated due to deposition of the weld bead layer 61 of next and subsequent layers, the layer cannot exceed the transformation point of ferrite, a uniformed structure including a fine ferrite phase is not obtained. As described above, the interpass temperature Tp in depositing the weld bead layer 61 of a next layer becomes less than 200° C. at an initial stage of depositing and therefore, a mixed structure including bainite as a main component is formed. In addition, if the interpass temperature Tp exceeds 550° C., the weld bead layer 61 is heated due to deposition of the weld bead layer 61 of a next layer, causing flattening or dropping down of the weld bead layer 61, and cannot be deposited in a predetermined shape.

Furthermore, the weld bead layer 61 having a fine ferrite phase with an average grain diameter of 11 μm or less has a Vickers hardness of 130 Hv or more and 178 Hv or less, and has good mechanical strength and substantially uniform hardness with little variation.

The weld bead layer 61 at the late stage of depositing (uppermost layer of the additively manufactured object), on which the weld bead layer 61 of a next layer is not deposited, is not heated and therefore, stays in a state where the molten filler metal W is naturally solidified, that is, retains a structure containing coarse ferrite, perlite and bainite. Thus, in this embodiment, on a lower layer and an upper layer of the plurality of weld bead layers 61 having a ferrite phase with an average grain diameter of 11 μm or less, another weld bead layer having a different crystal structure from the weld bead layer 61 is formed.

Figure 3:
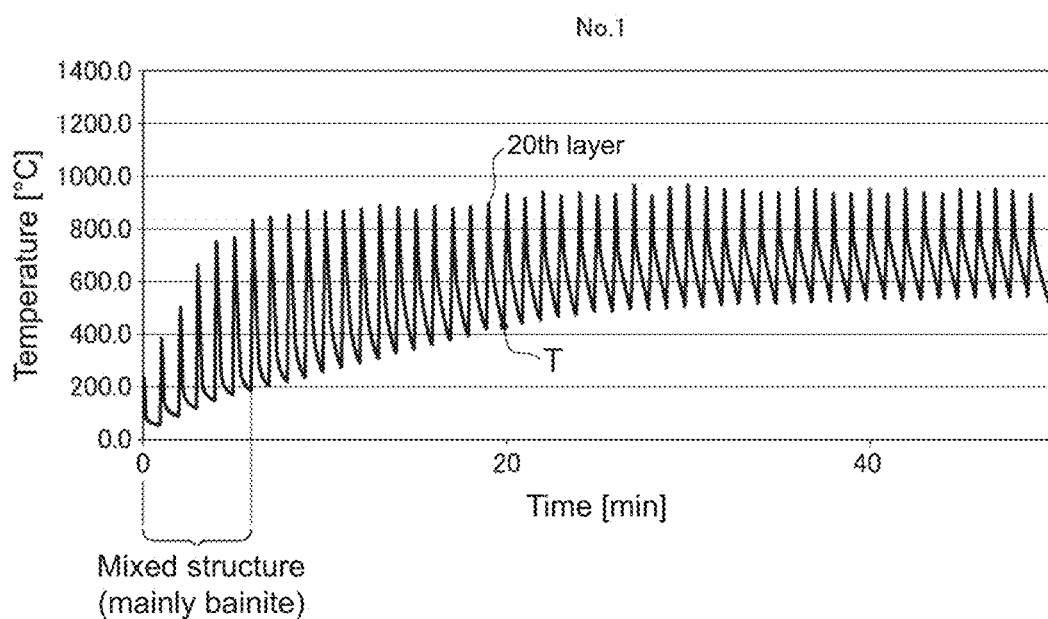
FIG. 3 is a graph illustrating the temperature change in the uppermost layer of the additively manufactured object deposited in Example No. 1.
Figure 4:
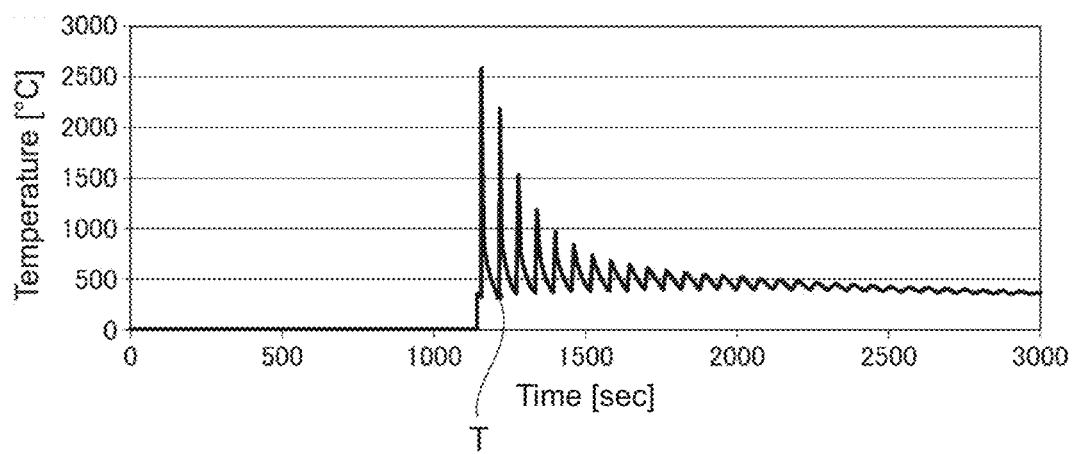
FIG. 4 is a graph illustrating the temperature change in a specific layer of the additively manufactured object deposited in Example No. 1.
Figure 5:
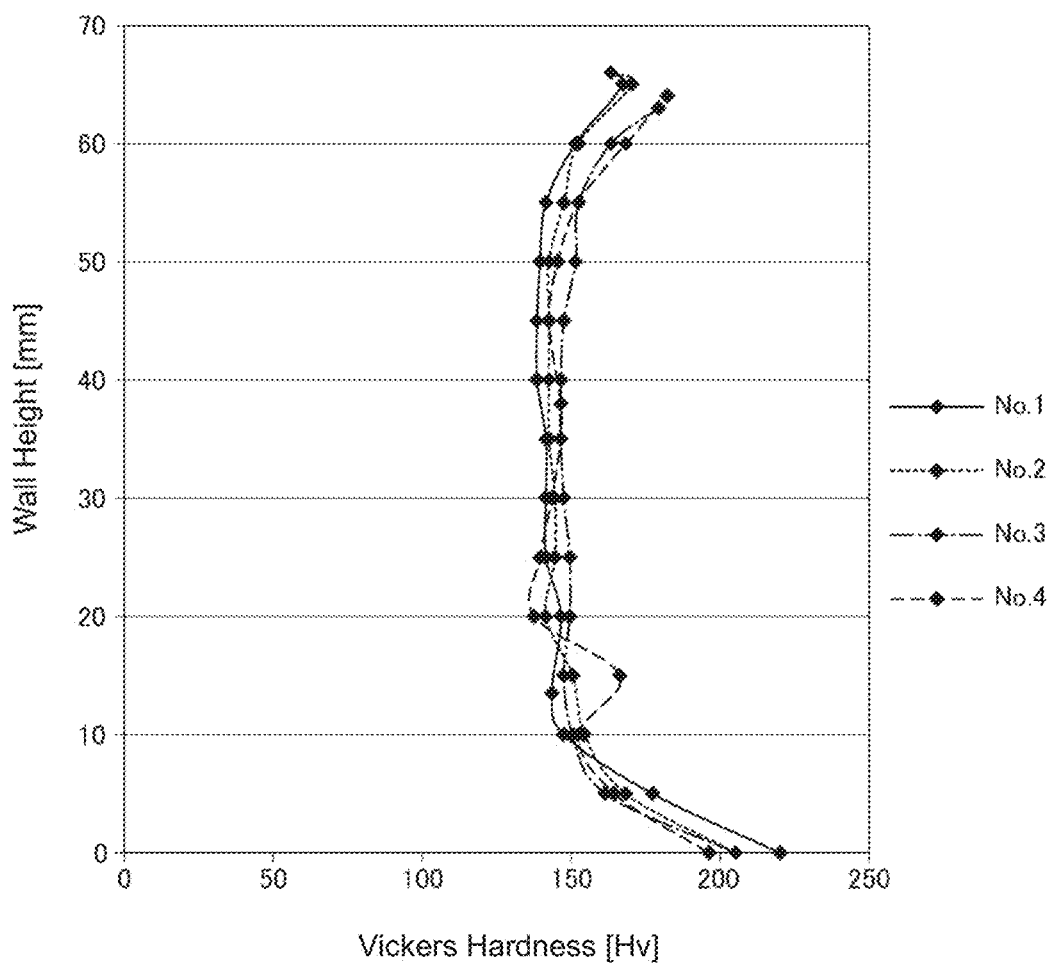
FIG. 5 is a graph illustrating the Vickers hardness in each part of the additively manufactured object where a plurality of weld bead layers are deposited in each Example.

In the following, using four Examples differing in the deposition conditions, substantially cylindrical additively-manufactured objects were shaped to verify the effects of the present invention. In Table 1, the deposition conditions of the weld bead layer 61 in four Examples No. 1 to No. 4, and the average grain diameter of the shaped additively-manufactured object 11 (weld bead layer 61 at the middle stage of depositing) are shown. FIG. 3 is a graph illustrating the temperature change in a surface layer of the uppermost layer of the additively manufactured object 11 of Example No. 1, and FIG. 4 is a graph illustrating the temperature change by extracting 20th layer of the weld bead layer 61 in Example No. 1. FIG. 5 is a graph illustrating the Vickers hardness in each part of the additively manufactured objects of Examples No. 1 to No. 4, and FIG. 6 is a microphotographic view of the additively manufactured object of Example No. 1. In FIG. 3, since the surface layer temperature of the weld bead layer 61 was measured using a thermoviewer, the temperature just proximal to the arc was not measured due to inhibition of intense arc light but in practice, reached the melting temperature that is higher than the temperature on the graph. Furthermore, FIG. 4 is the temperature history estimation results by numerical simulation, and even a temperature just proximal to the arc, which was not measured due to inhibition of intense arc light at the measurement with a thermoviewer, was estimated.

TABLE 1

| Example | Welding Current (A) | Arc Voltage (V) | Welding Speed (cm/min) | Interpass Temperature (° C.) | Interpass Time (sec) | Average Grain diameter (μm) |
|---|---|---|---|---|---|---|
| No. 1 | 112 | 16.3 | 40 | 540 | 60 | 9.2 |
| No. 2 | 112 | 16.3 | 40 | 380 | 90 | 9.1 |
| No. 3 | 112 | 16.3 | 40 | 290 | 120 | 11.0 |
| No. 4 | 168 | 18.1 | 40 | 550 | 90 | 9.3 |

As shown in Table 1, in Examples No. 1 to No. 3, the additively manufactured object 11 was formed by depositing a plurality of weld bead layers 61 under the conditions of a welding current of 112 A, an arc voltage of 16.3 V, and a welding speed of 40 cm/min, in which an interpass time is each changed to 60, 90, and 120 sec. Accordingly, the interpass temperature Tp at the middle stage of depositing lowers with increase in the interpass time and was 540° C., 380° C. and 290° C., respectively.

In addition, in Example No. 4, the additively manufactured object 11 was formed by depositing a plurality of weld bead layers 61 under the condition of a welding current of 168 A, an arc voltage of 18.1 V, a welding speed of 40 cm/min, and an interpass time of 90 sec. In this case, the interpass temperature Tp in Example No. 4 was 550° C. because of a large heat input amount.

The average grain diameter of the micronized ferrite structure of the weld bead layer 61 at the middle stage of depositing here was 9.2 μm, 9.1 μm, 11.0 μm, and 9.3 μm. In this way, by controlling the heat input amount such that the interpass temperature Tp is within the range of 200° C. to 550° C., a structure including a continuous fine ferrite phase having an average grain diameter of 11 μm or less is formed, thereby providing substantially uniform strength. It is understood that by making the structure include a fine ferrite phase having an average grain diameter of 11 μm or less, an additively manufactured object 11 having excellent mechanical properties without reduction in toughness is obtained.

Here, the average grain diameter was determined by, in the height direction of the weld bead layer 61, dividing a portion excluding the weld bead layer 61 at the initial stage of depositing with an interpass temperature Tp of less than 200° C., which is a mixed structure including bainite as a main component, and the weld bead layer 61 at the late stage of depositing, which is a structure containing coarse ferrite, perlite and bainite, into 5 equal parts, or in the width direction of the weld bead layer 61, dividing a portion excluding the surface oxide film into 3 equal parts, calculating the grain diameter according to JIS G0551 in a visual field of about 5 mm square of each portion, and averaging the values. The mixed structure including bainite as a main component, the micronized ferrite structure, and the structure containing coarse ferrite, perlite and bainite were distinguished based on boundary lines of an image by observing a cross-section of the weld bead layer 61 under an optical microscope (see, FIG. 6A). In addition, the surface oxide film was defined as a region from the surface to a depth of 0.3 mm.

Here, in Example No. 1, as illustrated in FIG. 3, with respect to the weld bead layer 61 at the initial stage of depositing (in Example illustrated in FIG. 3, first to sixth layers), which was melted and deposited on the substrate 60, the surface layer temperature of the weld bead layer 61 of a previous layer is below the lower limit (200° C.) of the allowable range of the interpass temperature Tp. Consequently, even when the weld bead layer 61 of next and subsequent layers is deposited, the layer cannot exceed the transformation point of ferrite, and a mixed structure including bainite as a main component is formed (see, FIG. 6B).

With respect to the weld bead layer 61 at the middle stage of depositing (in Example illustrated in FIG. 3, 7th to 49th layers), the surface layer temperature of the weld bead layer 61 at the time of depositing the weld bead layer 61 of next and subsequent layers (8th to 50th layers) is, as illustrated in FIG. 3, within the allowable range (200° C. to 550° C.) of the interpass temperature Tp.

For example, as illustrated in FIG. 4, with respect to the weld bead layer 61 of 20th layer, the interpass temperature Tp at the time of depositing the weld bead layer 61 of 21st layer is within the allowable range (point T shown in FIG. 3 (approximately 400° C.)) because the interlayer time and the heat input amount are controlled. In addition, in association with the deposition of the weld bead layer 61 of next and subsequent layers, the temperature of the weld bead layer 61 of 20th layer converges at approximately 400° C. after repetition of temperature rise and cooling with gradual decrease of the temperature variation. At this time, the surface layer temperature of the uppermost layer converges with approximately 540° C. as illustrated in FIG. 3.

Figure 6A:
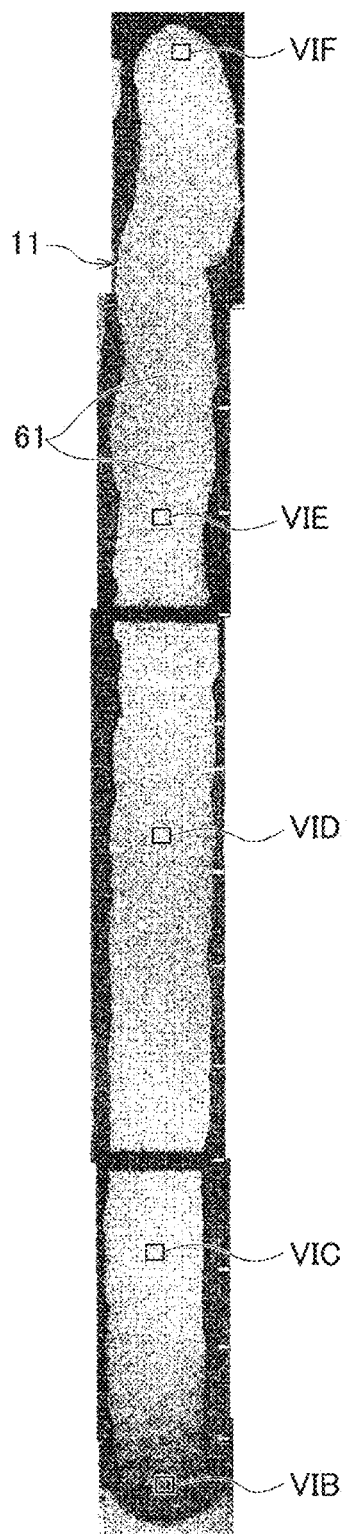
FIG. 6A is a cross-sectional photographic view of the additively manufactured object of Example No. 1.
Figure 6B:
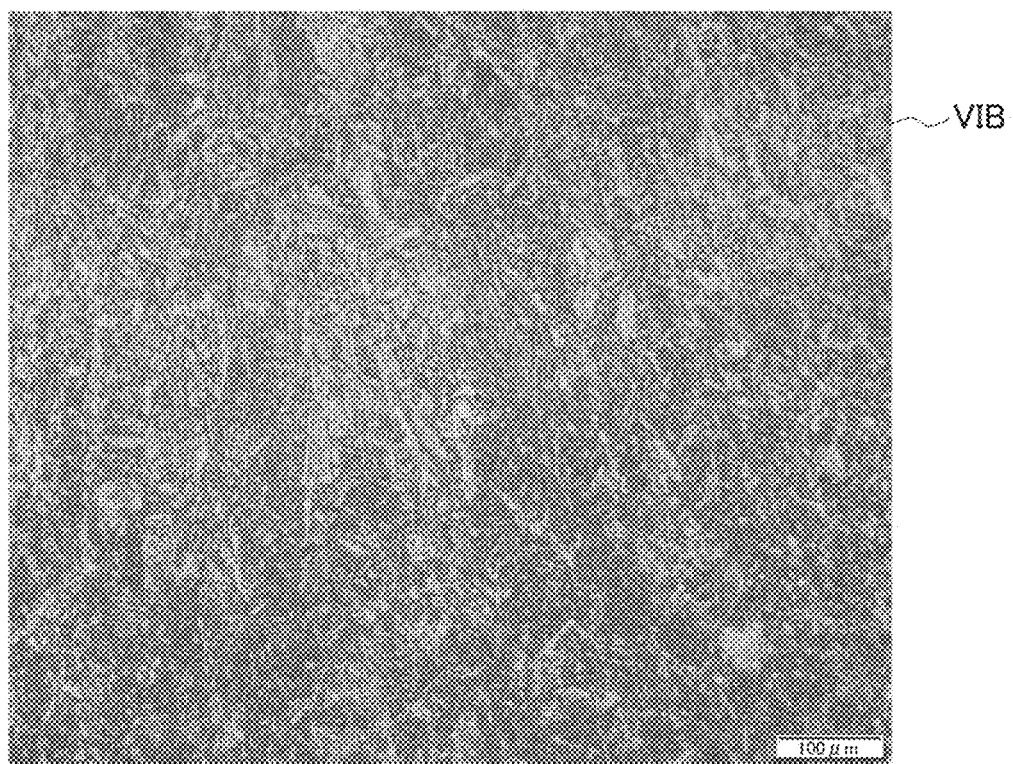
FIG. 6B is a cross-sectional photographic view of the structure of VIB of FIG. 6A.
Figure 6C:
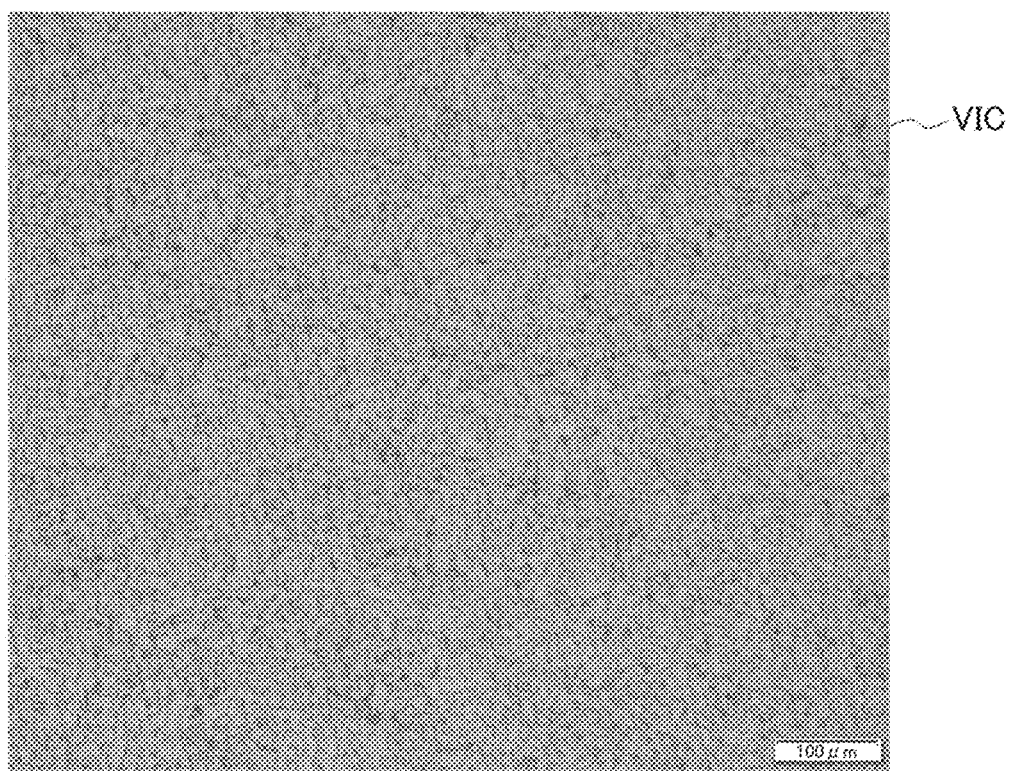
FIG. 6C is a cross-sectional photographic view of the structure of VIC of FIG. 6A.
Figure 6D:
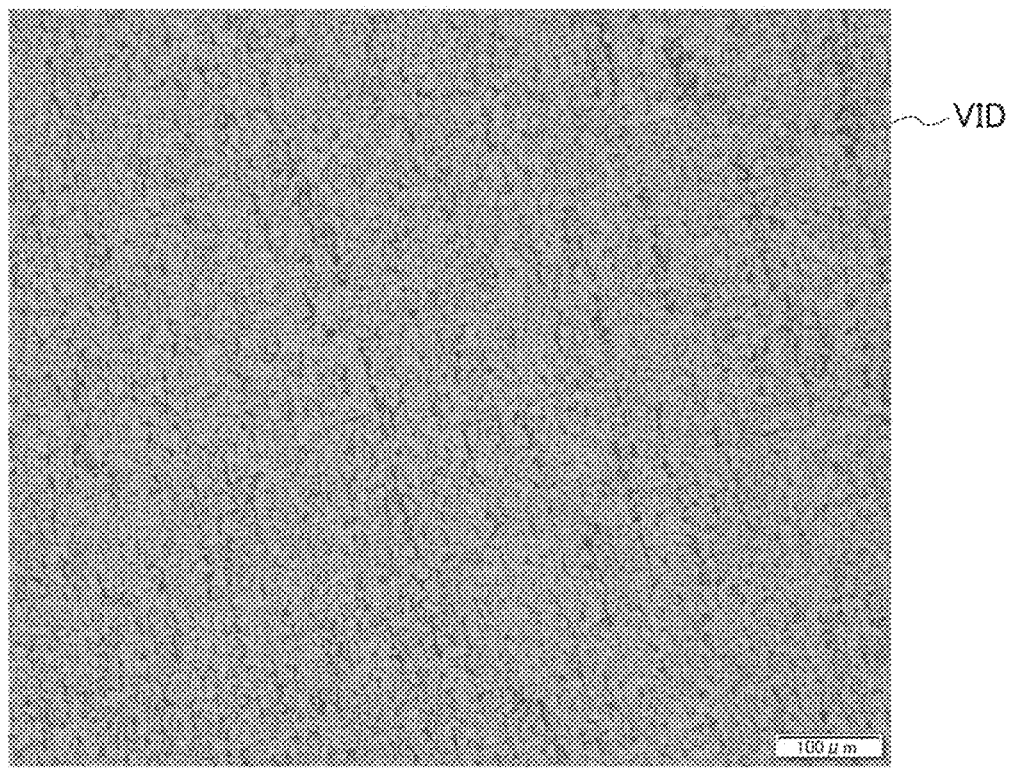
FIG. 6D is a cross-sectional photographic view of the structure of VID of FIG. 6A.
Figure 6E:
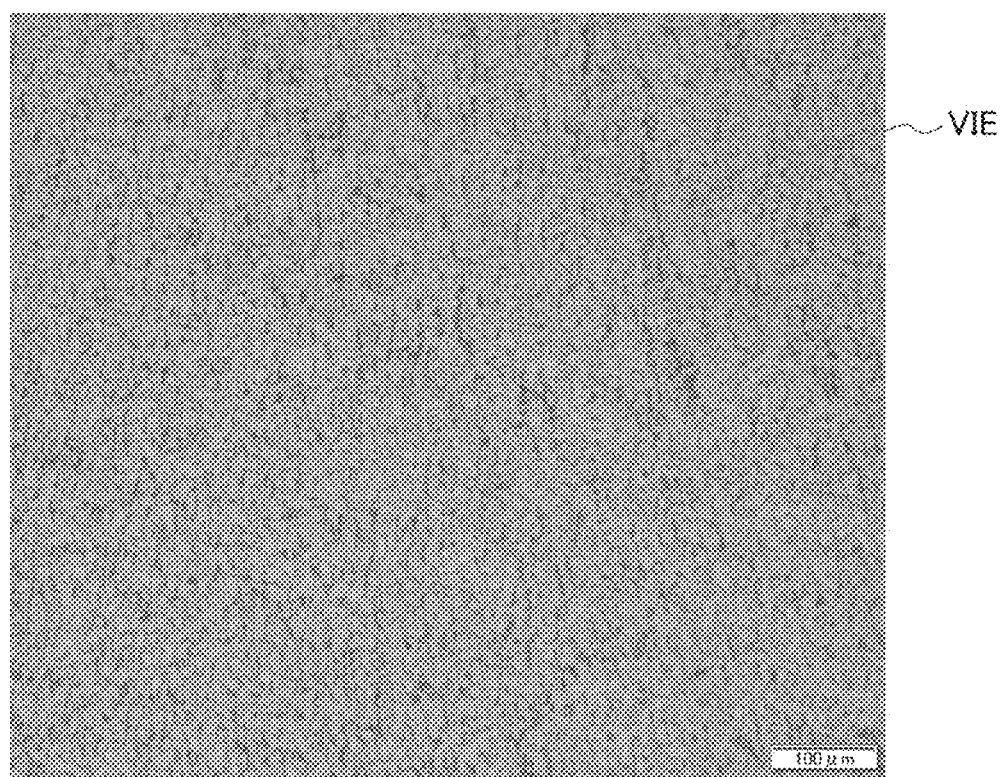
FIG. 6E is a cross-sectional photographic view of the structure of VIE of FIG. 6A.

Accordingly, the weld bead layer 61 is heated to a temperature exceeding the transformation point due to deposition of the weld bead layer 61 of next and subsequent layers, and as for the weld bead layer 61 at the middle stage of depositing, perlite and bainite are transformed into ferrite and coarse ferrite is micronized, resulting in a substantially uniform structure including a continuous ferrite phase having an average grain diameter of 11 μm or less (see, FIG. 6C to FIG. 6E). As illustrated in FIG. 3, the surface temperature of the uppermost layer during depositing gradually rises as the weld bead layer 61 of next and subsequent layers is deposited, and the interpass temperature stabilizes at approximately 540° C.

Figure 6F:
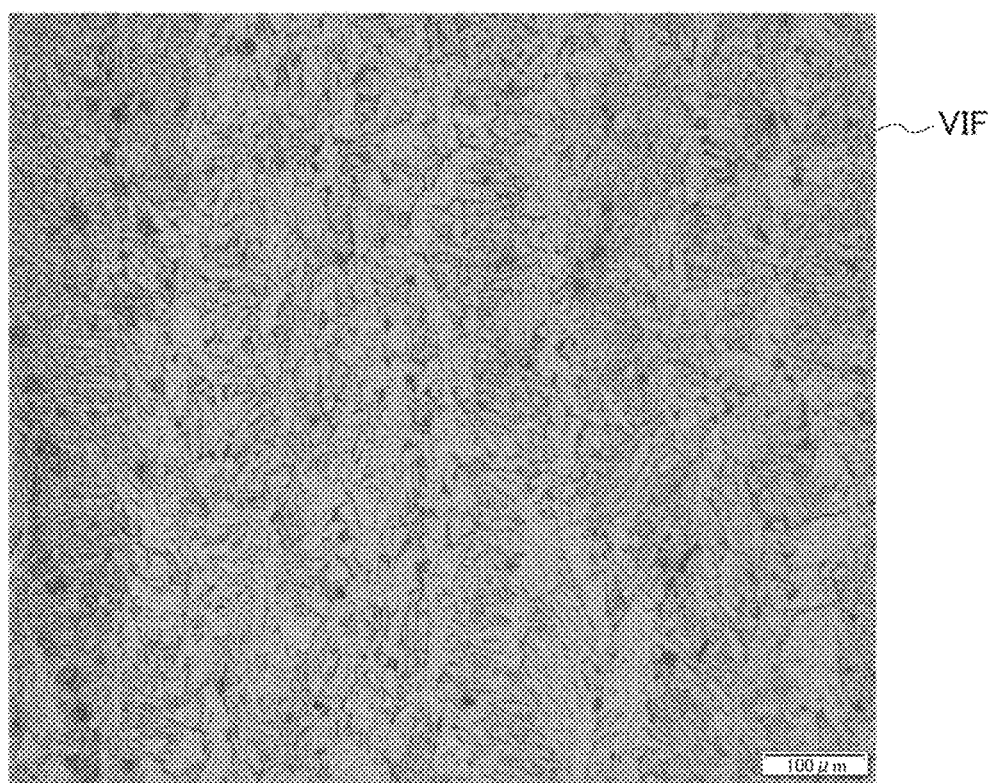
FIG. 6F is a cross-sectional photographic view of the structure of VIF of FIG. 6A.

In addition, the weld bead layer 61 at the late stage of depositing (in Example illustrated in FIG. 3, 50th layer), on which the weld bead layer 61 of a next layer is not deposited, is not heated and therefore stays in a state where the molten filler metal W is naturally solidified, that is, retains a structure containing coarse ferrite, perlite and bainite (see, FIG. 6F).

Furthermore, as illustrated in FIG. 5, in all Examples, the weld bead layer 61 at the middle stage of depositing including a continuous fine ferrite phase having an average grain diameter of 11 μm or less has a Vickers hardness of 130 Hv or more and 178 Hv or less and thus, providing substantially uniform hardness with little variation.

The structure of the weld bead layer 61 at the late stage of depositing is a structure containing coarse ferrite, perlite and bainite and therefore, the Vickers hardness is slightly high. In addition, the weld bead layer 61 at the initial stage of depositing is a mixed structure including bainite as a main component and therefore, has as a high Vickers hardness as approximately 200 Hv or more, but this is a structure having low toughness.

For this reason, in manufacturing a product by using the additively manufactured object 11, it may be also possible to use only a uniformed structure having a continuous micronized ferrite phase having an average grain diameter of 11 μm or less by removing the weld bead layer 61 at the initial stage of depositing having a mixed structure including bainite as a main component and, if desired, the weld bead layer 61 at the late stage of depositing.

In depositing the additively manufactured object 11, in a case where the deposition time per layer of the weld bead layer 61 is set to a cooling time until the layer is cooled to the allowable interpass temperature Tp from the temperature at the start of deposition, the weld bead layer 61 can be continuously deposited in a shortest time without temporarily stopping the arc, and the production efficiency is enhanced.

Setting of the deposition time per layer of the weld bead layer 61 may be adjusted by changing at least one welding condition of welding current, arc voltage and welding speed in the depositing step while a heat input amount per unit length of the weld bead layer 61 in the depositing step is kept constant.

Alternatively, setting of the deposition time per layer of the weld bead layer 61 may be adjusted by changing at least one welding condition of welding current, arc voltage and welding speed in the depositing step such that a cross-sectional area of the weld bead layer 61 in the depositing step is kept constant. This configuration enables stable deposition while maintaining high deposition efficiency and ensuring deposition precision.

As described above, in the additively manufactured object 11 of this embodiment, at least one weld bead layer 61 has a ferrite phase having an average grain diameter of 11 μm or less in a part except for the surface oxide film, and therefore, the additively manufactured object 11 having a uniformed structure and substantially uniform strength, and as a result, an additively manufactured object 11 having excellent mechanical properties is obtained.

In addition, the Vickers hardness of the weld bead layer 61 having a ferrite phase with an average grain diameter of 11 μm or less is 130 Hv or more and 178 Hv or less and therefore, an additively manufactured object 11 having a structure having appropriate toughness and hardness is obtained.

Furthermore, the weld bead layer 61 having a ferrite phase with an average grain diameter of 11 μm or less has, in the lower part and the upper part, another weld bead layer 61 which is different in the crystal structure from the weld bead layer 61. As a result, the weld bead layer 61 having a micronized ferrite phase with an average grain diameter of 11 μm or less can be stably formed.

In addition, each of weld bead layers 61 has the same shape in top view and therefore, the weld bead layer 61 of each layer is deposited substantially under the same conditions to provide a substantially uniform structure.

Furthermore, according to the production method for an additively manufactured object of this embodiment, the weld bead layer 61 of a next layer is deposited when the surface layer temperature of the weld bead layer 61 is within the range of 200° C. to 550° C. by controlling the interlayer time and heat input amount and therefore, the weld bead layer 61 becomes a uniformed structure having a ferrite phase with an average grain diameter of 11 μm or less in a part except for the surface oxide film, thereby providing substantially uniform strength.

Moreover, each of weld bead layers 61 is deposited while the interlayer time and the heat input amount are constant and therefore, a uniform structure is obtained with good production efficiency.

Figure 7:
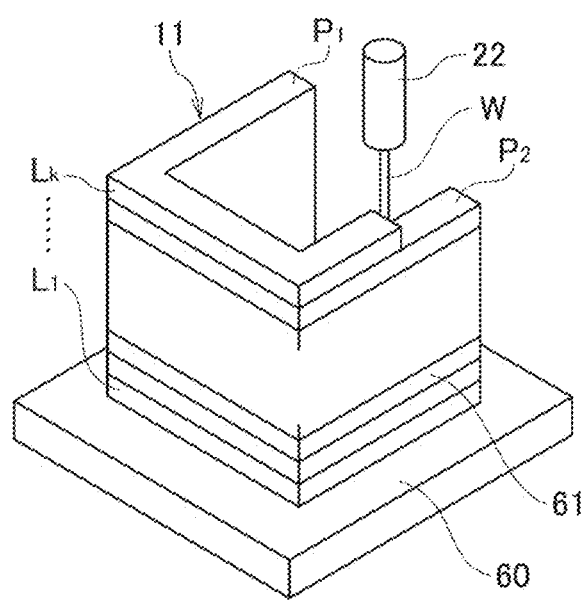
FIG. 7 is a perspective view of a U-shaped additively-manufactured object produced by the production system for an additively manufactured object.

FIG. 7 illustrates a case of forming the additively manufactured object 11 that is a modified example in which the start position P1 and the end position P2 of the molten beads of respective layers deposited are different. Also in this case, deposition of the weld bead layer 61 of a next layer is started when the temperature of the weld bead layer 61 of a previous layer is within the allowable interpass temperature Tp range.

In this case, the deposition time per layer of the weld bead layer 61 may be set to be equal to or more than the cooling time, but in a case where the total of the deposition time and the travel time of the welding torch 22 per layer of the weld bead layer 61 is set to be equal to or more than the cooling time, the production efficiency can be more enhanced.

Second Embodiment

Figure 8:
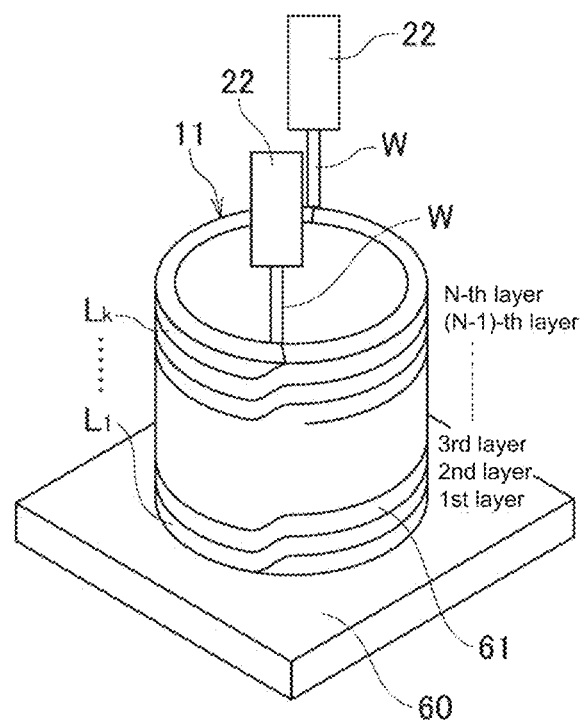
FIG. 8 is a schematic view of a configuration of the production system for an additively manufactured object in a second embodiment of the present invention.

The production method and production system for an additively manufactured object according to a second embodiment of the present invention are described in detail below by referring to FIG. 8. Note that the parts which are the same as or equivalent to the first embodiment are denoted by the same numerical references and their descriptions are omitted or simplified.

In this embodiment, in a case where the deposition time per layer of the weld bead layer 61 to be deposited using one welding torch 22 is very long compared with the cooling time, a plurality of weld bead layers 61 are simultaneously deposited using a plurality of welding torches 22 to enhance the production efficiency.

More specifically, the number of welding torches 22 in depositing the weld bead layer 61 is set to an integer value of the quotient obtained by dividing the deposition time per layer of the molten bead 61 to be deposited using one welding torch 22, by the cooling time. For example, as illustrated in FIG. 8, in a case where the integer value of the quotient obtained by dividing the deposition time per layer of the weld bead layer 61 with one welding torch 22 by the cooling time is 2, the deposition is performed using two welding torches 22.

In this embodiment, as for the cooling time, a cooling time until the weld bead layer 61 of a previous layer is cooled from the temperature at the start of deposition to the allowable interpass temperature is measured, and the number of welding torches 22 is determined when the molten bead 61 of a next layer is deposited. However, in the case of manufacturing the same built-up object, cooling times until the weld bead layer 61 is cooled from the temperature at the start of deposition to the allowable interpass temperature in all layers may be measured when a first built-up object is manufactured, the longest cooling time may be set as the cooling time, and the number of welding torches 22 in manufacturing second and subsequent built-up objects may be set based on the cooling time.

Other configurations and actions are the same as those of the first embodiment.

The present invention is not limited to the above-described embodiments, and modifications, improvements, etc. can be appropriately made therein.

REFERENCE SIGNS LIST

11 Additively manufactured object
61 Weld bead layer
W Filler metal

The invention claimed is:

1. A method for producing an additively manufactured object, comprising subjecting a weld bead layer formed of a weld bead obtained by melting and solidifying a filler metal made of a mild steel by use of an arc to repeated deposition of the weld bead layer of a next layer, wherein an interlayer time and a heat input amount are controlled such that when a surface layer temperature of the weld bead layer is within a range of 200° C. to 550° C., the weld bead layer of a next layer is deposited, and the obtained weld bead layer has a continuous fine ferrite phase having an average grain diameter of 11 μm or less has a Vickers hardness of 130 Hv or more and 178 Hv or less.

2. The method for producing an additively manufactured object according to claim 1, wherein each of the weld bead layers is deposited while the interlayer time and the heat input amount are constant.

3. The method for producing an additively manufactured object according to claim 1, wherein each of the weld bead layers is deposited to have a same shape in top view.

4. The method for producing an additively manufactured object according to claim 1, wherein after a predetermined number of the weld bead layers are deposited, the interlayer time and the heat input amount are controlled such that when the surface layer temperature of the weld bead layer is within a range of 200° C. to 550° C., the weld bead layer of a next layer is deposited.

5. The method for producing an additively manufactured object according to claim 1, wherein the surface layer temperature of the weld bead layer is maintained within a range of 200° C. to 550° C. without using a cooling or heating device to cool or heat the surface layer when the weld bead layer of the next layer is deposited.

* * * * *